(No Model.)
M. C. WALLACE.
CHURN.
No. 253,961. Patented Feb. 21, 1882.
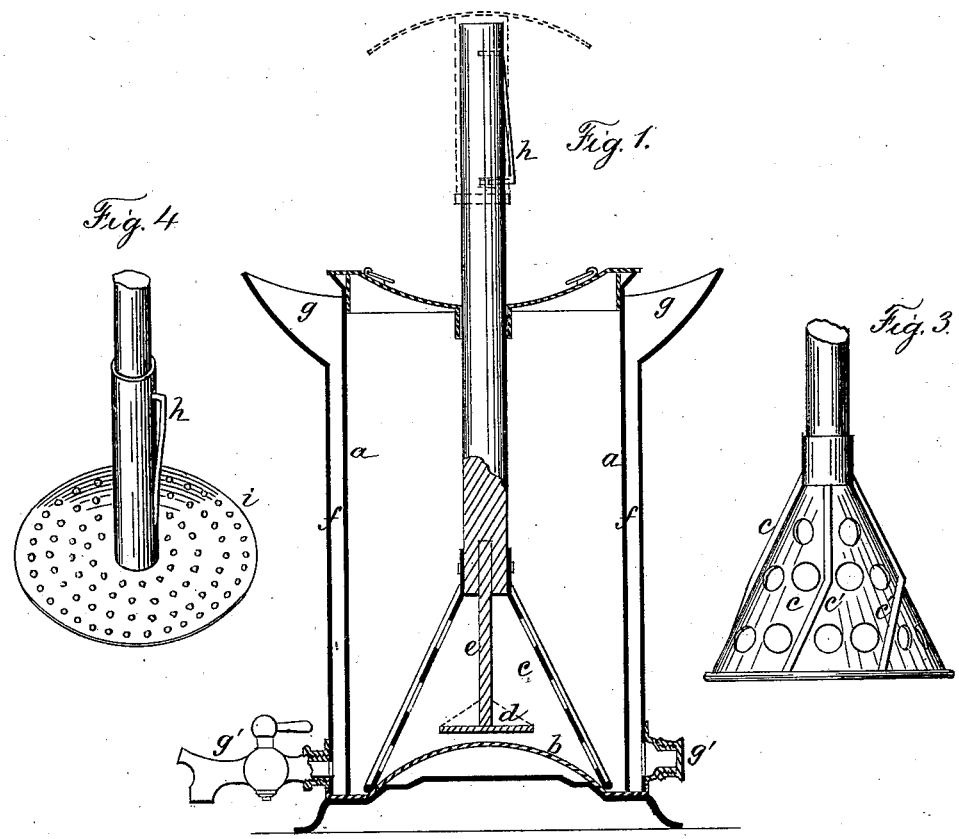
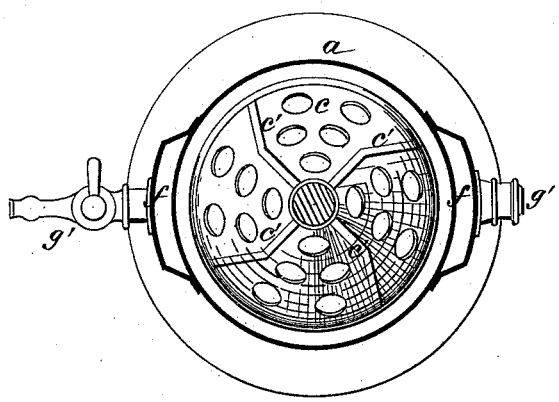
Witnesses:
Edmond Brodhag
Howell Bartle.
Inventor:
Micager C. Wallace,
by Johnson and Johnson
Attys.

UNITED STATES PATENT OFFICE.

MICAGER C. WALLACE, OF SAULSBURY, TENNESSEE.

CHURN.

SPECIFICATION forming part of Letters Patent No. 253,961, dated February 21, 1882.

Application filed July 12, 1881. (No model.)

*To all whom it may concern:*

Be it known that I, MICAGER CILVESTOR WALLACE, a citizen of the United States, residing at Saulsbury, in the county of Hardeman, State of Tennessee, have invented new and useful Improvements in Churns, of which the following is a specification.

The dash of the churn is of conical form with perforated walls, with which a flat dash within the cone co-operates in the up and down movements of the dash, while oblique ribs upon the outer wall of the cone serve as lifting-beaters in the upward movement of the dash. In the upstroke of the dash the cream pours through the perforations upon the inside flat dash, while the oblique ribs around the outer conical surface have a lifting beating action, so that in both movements of the dash the cream is beaten and forced upward, giving a very thorough agitation and producing butter in a very short time. The oblique ribs in connection with the perforations present an outer surface of edges with a cutting action upon the cream in the upstroke of the dash, and the oblique relation of the ribs to the conical walls of the dash give a partial rotary dashing to the cream on the upstroke of the dash. The vessel is of sheet metal with outer-wall side chambers for cold or hot water for tempering the cream, and a supplemental convex bottom is provided for co-operating with the inner flat dash. The outer or handle end of the staff is provided with means adapted to engage with a tubular holder of a strainer for dipping out the butter. The special points of improvement as to these matters will be specifically pointed out in the claim.

Referring to the accompanying drawings, Figure 1 represents a vertical section of a churn embracing my improvements; Fig. 2, a horizontal section of the same; Fig. 3, the dash; and Fig. 4, the dash-staff with a strainer attachment.

The churn-vessel $a$ is preferably of tin, of cylindrical form, and has a double bottom, the inner one, $b$, being convex, making the bottom stronger and more durable. The dash-staff pierces the cover of the vessel, and the latter has hand-holds, by which to lift it.

The dash $c$ is preferably of tin, of conical or cup form, with its walls perforated, and is secured to the lower end of the staff. Within the cup is a smaller dash, $d$, of flat form, and secured to the staff by a stem, $e$, so as to beat and break up the cream within the cup in both movements of the dash, while the descending action of the cup forces the cream or milk violently out through its wall perforations, and thus gives a very complete dashing and spurting to the body of the cream within and without the cup-dash, and which I find very effective in producing the butter. The flat dash may or may not be perforated, and may also be of tin, and serves to compact the forming particles of butter against the convex bottom, which, however, it does not strike. The edge of the cup is wired, and its outer wall is provided with ribs $c'$, by which the cup is rendered strong. The ribs I prefer should stand oblique on the cup, so as to have a lifting action upon the milk in raising the dash.

Chambers $f$ are provided on the outer walls of the vessel for receiving cold or hot water, whereby the cream or milk may be kept cooled or warmed to turn it ready for churning, which I find very advantageous in hastening the production of the butter. These chambers may also be used to cool the vessel, and thus harden the butter, to facilitate its removal after the churning. They are soldered preferably on opposite sides of the vessel, have flaring upper ends, $g$, and are provided with screw caps or cocks $g'$, to let out the water.

Ice may be used in the chambers to keep the milk cool until it is desired to churn, and then the milk may be warmed to turn it.

The dash-staff is provided at its upper end with a spring-catch, $h$, adapted to engage with and hold a strainer attachment, $i$, for dipping out the butter by reversing the dash, having previously removed the cover from the staff. In churning the strainer is removed.

Referring to the flat dash, its upper surface may be conical, as shown by dotted lines, and in the ascent of the dash the cream in pouring through the perforations of the cup strikes upon the inner dash, so that the co-operative action of the perforated cup and the flat dash is effective in the ascent and descent of the dash in producing a most thorough mixing and agitation of the cream.

I claim—

A churn-dash consisting of the perforated conical dash $c$, provided with the oblique ribs $c'$ upon its outer surface, the inner flat dash, $d$, and a spring-catch at its handle end adapted to engage with the tubular holder of an attachable strainer, $i$, as shown and described.

In testimony whereof I have hereunto set my hand in the presence of two subscribing witnesses.

MICAGER C. WALLACE.

Witnesses:
J. A. MANSON,
W. W. R. ELLIOTTE, Jr.